United States Patent [19]

Sim et al.

[11] 4,288,022
[45] Sep. 8, 1981

[54] UNDERWATER EXPLOSIVE WELDING

[75] Inventors: Terence Sim; Keith Allen, both of Barrow-in-Furness, England

[73] Assignee: Vickers Limited, London, England

[21] Appl. No.: 83,274

[22] Filed: Oct. 10, 1979

[30] Foreign Application Priority Data

Oct. 10, 1978 [GB] United Kingdom ............... 39943/78

[51] Int. Cl.³ ............................................. B23K 28/00
[52] U.S. Cl. ..................................... 228/107; 228/218
[58] Field of Search ............... 228/107, 221, 2.5, 218, 228/219; 285/351

[56] References Cited

U.S. PATENT DOCUMENTS

| 2,829,909 | 4/1958 | Magnani | 285/351 X |
| 3,667,785 | 6/1972 | Kapeker | 285/351 X |
| 3,774,291 | 11/1973 | Snyder et al. | 228/107 X |
| 3,900,148 | 8/1975 | Dickenson et al. | 228/107 |

FOREIGN PATENT DOCUMENTS 7804397 10/1978 Netherlands ...................... 228/107

Primary Examiner—Richard B. Lazarus
Attorney, Agent, or Firm—William R. Hinds

[57] ABSTRACT

First and second underwater tubular members are assembled together so that the outer surface of the first tubular member and the inner surface of the second tubular member are spaced apart to form an annular cavity. The cavity is sealed, cleaned and dried and filled with a gas at a pressure greater than the surrounding water pressure. The pressure in the cavity is reduced prior to detonating an explosive charge within the first tubular member to weld the members together. The cavity may be subdivided into a plurality of zones by further seals, the pressure in the zones being separably adjustable so as to be able to control the pressure difference across each seal.

3 Claims, 1 Drawing Figure

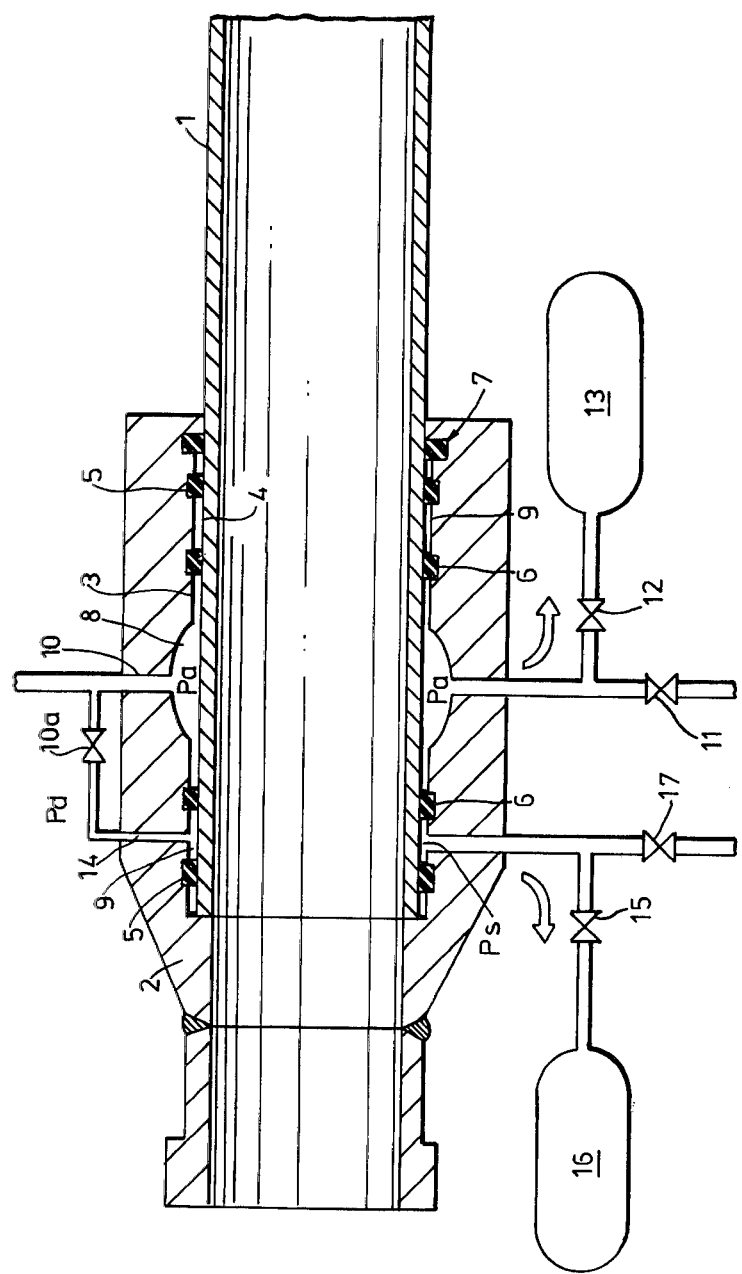

UNDERWATER EXPLOSIVE WELDING

This invention relates to underwater engineering and is concerned with the welding together of two submerged members by an explosive welding technique.

Explosive welding is a useful technique for securing together underwater a tubular member, such as a pipe, to another tubular member such as a flange or a connector. In such operations the pipe is inserted into the other tubular member so that the outer surface of the pipe and the inner surface of the other tubular member are spaced apart to form an annular cavity. Thereafter, an explosive charge is detonated inside the pipe so that the outer surface of the pipe is urged across the cavity and against the inner surface of the other tubular member so as to become welded thereto. Ordinarily, the cavity will be full of water, probably seawater, and in order to produce a weld, it is necessary to remove this water, and any other contaminants such as salts or debris, from the cavity. Conventionally, this is effected by mechanically sealing the cavity, flushing out the cavity using flushing liquids, and then drying the cavity by passing appropriate gases through the same. Finally, the cavity is filled with gas at a positive pressure with respect to the depth pressure in order to assist in preventing water from entering the cavity. Then, the explosive charge is detonated so as to effect the desired welding.

It will be apparent that, as the depth pressure increases, it is necessary similarly to increase the pressure of gas in the cavity in order to keep the water out. This gas pressure in the cavity opposes the collision between the pipe and the other tubular member during the welding step. Thus, a potential limitation is imposed upon the depth at which explosive welding operations can be carried out in this way.

According to one aspect of the present invention, there is provided a method of explosively welding together an inner first tubular member and an outer second tubular member underwater which comprises inserting the first tubular member into the second tubular member so that the outer surface of the first tubular member and the inner surface of the second tubular member are spaced apart to form an annular cavity, sealing the cavity to prevent ingress of water, cleaning and drying the cavity, introducing gas into the cavity at a pressure greater than the surrounding water pressure, and reducing the pressure in the cavity prior to detonating an explosive charge within the first tubular member to cause the outer surface of the first member to be urged across the cavity and into collision with the inner surface of the second member and become welded thereto.

If desired a further seal may be included in the cavity so as to divide the cavity into first and second zones whose pressures can be varied independently, the first zone being the zone where the weld is to be primarily produced and the second zone being located between the first zone and the ambient water. After cleaning and drying at least the first zone, the zones will be maintained at a pressure slightly in excess of ambient pressure. Then, just prior to detonation, the pressures in the zones are reduced such that the pressure in the first zone is a suitable welding pressure and the pressure in the second zone is intermediate the ambient pressure and the pressure in the first zone. In this way, the pressure differences across the seals can be minimised. If desired, more than one further seal may be included so as to divide the cavity into a first zone, a second zone adjacent thereto and one or more other zones between the second zone and the ambient water, the pressure in each of the zones being independently variable. One aspect of the present invention includes an outer tubular member adapted to receive at least one further seal in this way.

Accordingly, this aspect of the present invention provides a tubular member for use as a second tubular member in accordance with the aforementioned method, which member comprises:

(a) first and second portions in its inner surface to receive first and second outer seals for making a fluid tight joint between the inner surface and the outer surface of the first member and thereby define an annular cavity between the two in use, (b) at least one further portion in its inner surface and located between the first and second portions to receive a further seal for making a fluid tight joint between the inner surface and the outer surface of the first member so as to divide said cavity into a first zone and at least one other zone, (c) a means of introducing fluid into, and removing fluid from, the first zone of the cavity and (d) a means of introducing fluid into, and removing fluid from, the or each other zone. The means of introducing fluid into and removing fluid from, the zones may be in the form of conduits extending from the outer surface of the outer tubular member, through the wall of the outer tubular member, and terminating at the inner surface of the outer tubular member in the zones.

For a better understanding of the invention and to show how the same may be carried into effect, reference will now be made by way of example to the accompanying drawing which is a diagrammatic section through a tubular member in accordance with the present invention disposed around a further tubular member which is to be explosively welded thereto in accordance with the method of the present invention.

Referring to the drawing there is shown an inner first tubular member in the form of an underwater pipe 1. The end of the pipe 1 is inserted into the end of an outer second tubular member 2 in the form of a pipe connector. The connector 2 is arranged around the end of the pipe 1 so that the inner surface 3 of the tubular member 2 is spaced from the outer surface 4 of the pipe 1. The inner surface of the outer member 2 includes first and second portions in the form of peripheral grooves to receive first and second outer inflatable seals 5 and includes two further portions in the form of peripheral grooves to receive further seals in the form of first and second inner inflatable seals 6, the seals being such as to contact the outer surface of the pipe 1 and form a fluid tight joint therewith. An additional groove is provided near the free end of the connector 2 to receive an inflatable test seal 7.

The arrangement is such that the outer seals 5 define an annular cavity between the outer surface of pipe 1 and the inner surface of connector 2 and this cavity is effectively divided by the inner seals 6 into an inner first zone 8 bounded by an outer second zone 9. The connector 2 includes a first inlet conduit 10 having one end terminating in the inner zone 8 of the cavity and connected, at its other end, to a source of flushing liquids and drying gases etc (not shown). The connector 2 additionally includes a first outlet conduit having one end in communication with the inner zone 8 of the cavity and terminating, at its other end, in a pair of branch pipes provided with valves 11 and 12. That branch pipe carrying valve 12 is connected to a first pressure reducing container 13 and the other branch pipe is a vent pipe.

The inlet conduit 10 also includes a branch pipe which is provided with a valve 10a and is for the purpose of connecting the source of flushing liquids and drying gases to a second inlet conduit 14 in the connector 2 and leading to one of the outer zones 9 of the cavity. An inlet conduit (not shown) is similarly provided for the other outer zone 9 of the cavity.

The connector 2 additionally includes a second outlet conduit having one end in communication with the outer zones 9 and terminating at its other end in first and second branch pipes. The first branch pipe is provided with a valve 15 whereby the outer zones 9 of the cavity may be put in connection with a second pressure reducing container 16 and the second branch pipe is a vent pipe provided with a valve 17.

In use, the pipe 1 is inserted into the connector 2 as shown and the seals 5 and 6 are activated. Also, an explosive charge (not shown) is appropriately positioned within the pipe 1. Thereafter, the cavity is cleaned and dried. More particularly, with valves 10a, 11 and 17 open and valves 12 and 15 closed the water present in the inner and outer zones 8 and 9 of the cavity is removed by the flushing liquids and the cavity is then dried by means of the drying gases. The gas pressure in the zones 8 and 9 of the cavity is then increased to a pressure greater than the ambient pressure (Pd) so as to prevent seepage of water back into the cavity. (Although, as above described the two outer zones of the cavity are cleaned and dried as well as the inner zone 8 this is not strictly necessary in as much as a weld is not normally produced in this region as will be apparent hereinafter. All that is required of the outer zones 9 is that they are at the correct pressure).

Just prior to detonating the explosive, valves 15 and 12 are opened (with valves 10a, 11, and 17 closed) so that gas in the outer zones 9 of the cavity may leave the cavity and enter cylinder 16 which is at low pressure or vacuum and so that gas in the inner zone 8 of the cavity may leave the cavity and enter cylinder 13 which is also at low pressure or vacuum. The pressure (Ps) in the outer zones 9 of the cavity and the pressure (Pa) in the inner zone 8 of the cavity are allowed to drop so that they are less than the ambient pressure (Pd). In the event that there is any water leakage during this time past the outer seals 5, the water will be confined to the outer zones 9 of the cavity by the inner seals 6. The pressure in outer zones 9 is reduced progressively to ensure that each seal remains substantially effective. The number of seals between the two members may be increased if necessary to provide the most effective water barrier depending upon the conditions prevailing in any set of circumstances. Thus, for example, each seal, instead of being a single seal as shown, may be in the form of a bank of seals. By opening valves 15 and 12 simultaneously, it can be ensured that the pressure difference across any particular seal is at a minimum. The pressures are reduced until such time as the pressure (Pa) in the inner zone 8 of the cavity is at a predetermined value which is known to allow the formation of good welds by explosive welding techniques and the system is so devised that at the instant immediately prior to welding pressure (Ps) is intermediate between pressures (Pa) and (Pd). In practice, the amount to which the pressures (Ps) and (Pa) are to be reduced can be controlled by opening valves 15 and 12 for predetermined lengths of time. After such a predetermined time interval, the explosive charge may then be detonated to form an acceptable weld at least in the vicinity of the inner zone 8 of the cavity.

We claim:

1. A method of explosively welding together an inner first tubular member and an outer second tubular member underwater which comprises inserting the first tubular member into the second tubular member so that the outer surface of the first tubular member and the inner surface of the second tubular member are spaced apart to form an annular cavity, sealing the cavity to prevent ingress of water, cleaning and drying the cavity, introducing gas into the cavity at a pressure greater than the surrounding water pressure, and reducing the pressure in the cavity prior to detonating an explosive charge within the first tubular member to cause the outer surface of the first member to be urged across the cavity and into collision with the inner surface of the second member and become welded thereto.

2. A method in accordance with claim 1 which comprises providing a seal within the cavity so as to divide the cavity into first and second zones and reducing the pressures in said zones prior to detonating the explosive charge such that the pressure in the second zone is intermediate the ambient pressure and the pressure in the first zone.

3. A method in accordance with claim 1 wherein the outer second tubular member includes conduit means extending through the outer tubular member and terminating at its inner surface and wherein the method comprises the steps of introducing flushing liquids and drying gases into the cavity through the conduit means, introducing said gas into the cavity at a pressure greater than the surrounding water pressure by means of said conduit means, and reducing the pressure prior to detonation by removing gas from the cavity via said conduit means.

* * * * *